Figure 1:
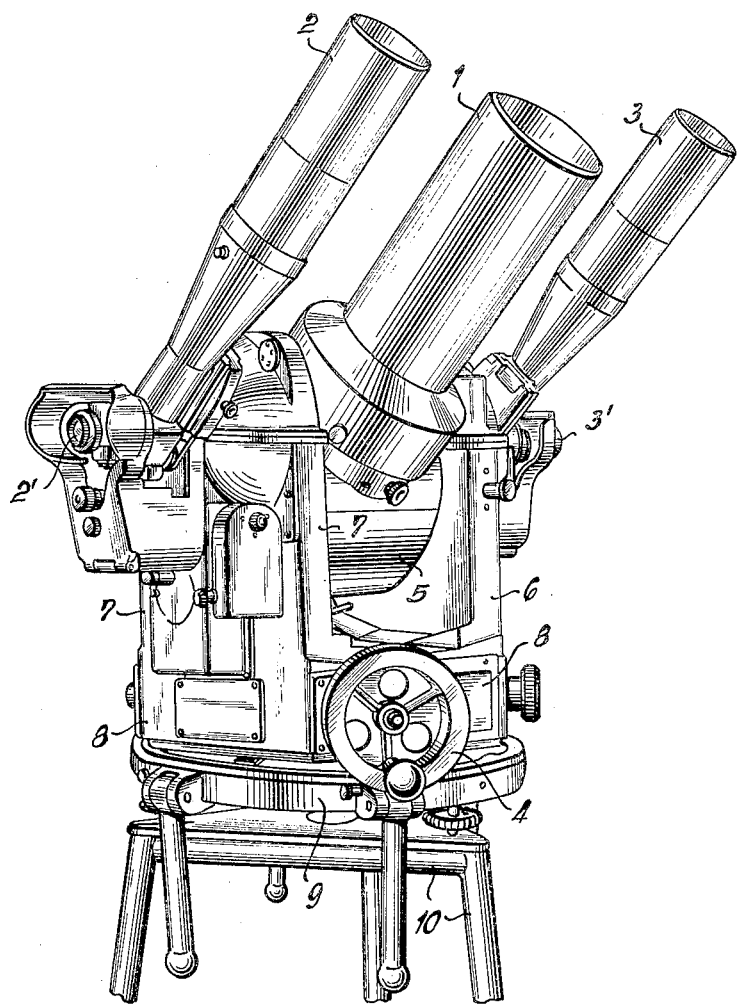

July 30, 1963 E. FRISCH 3,099,090
METHOD AND APPARATUS FOR DIGITAL INDICATION OF SHAFT POSITION
Filed June 17, 1960 5 Sheets-Sheet 1

INVENTOR
Eberhard FRISCH

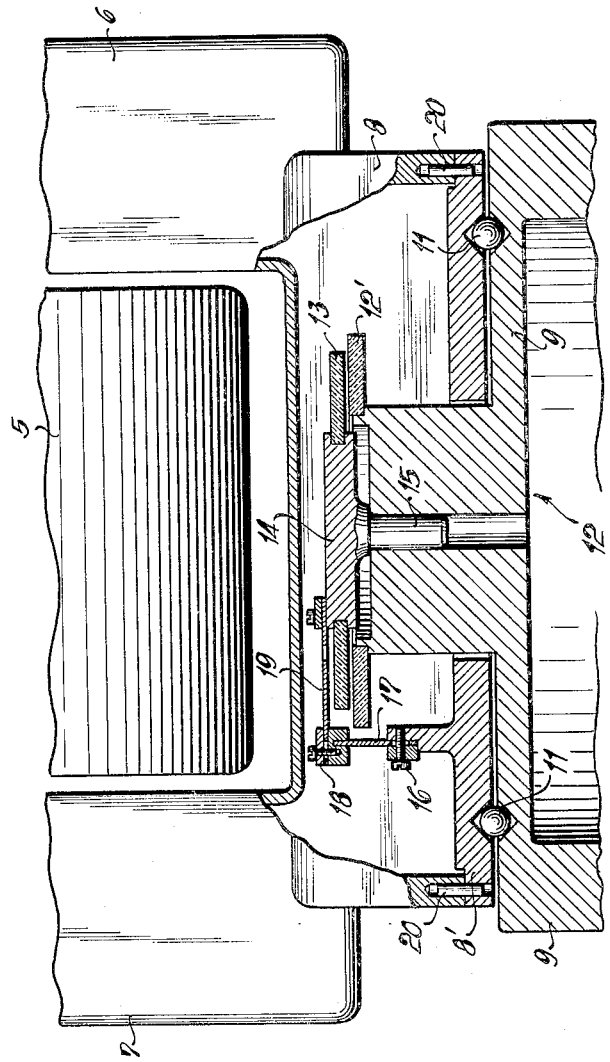

July 30, 1963  E. FRISCH  3,099,090
METHOD AND APPARATUS FOR DIGITAL INDICATION OF SHAFT POSITION
Filed June 17, 1960  5 Sheets-Sheet 3
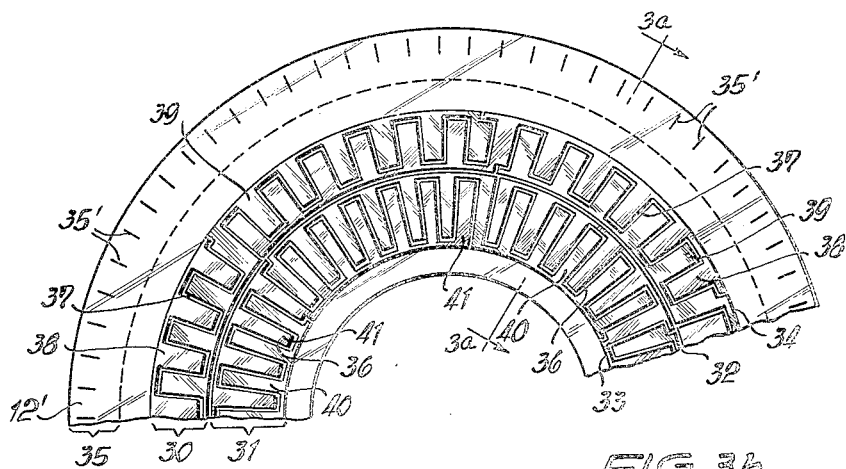
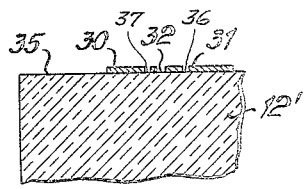
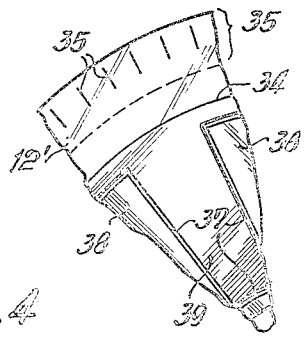
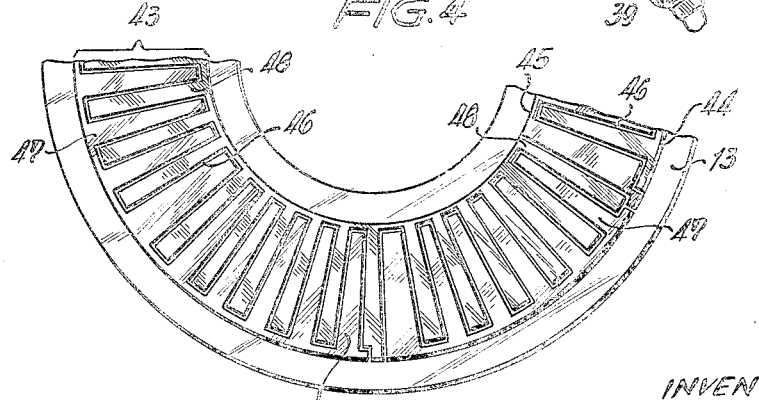
INVENTOR
Eberhard FRISCH

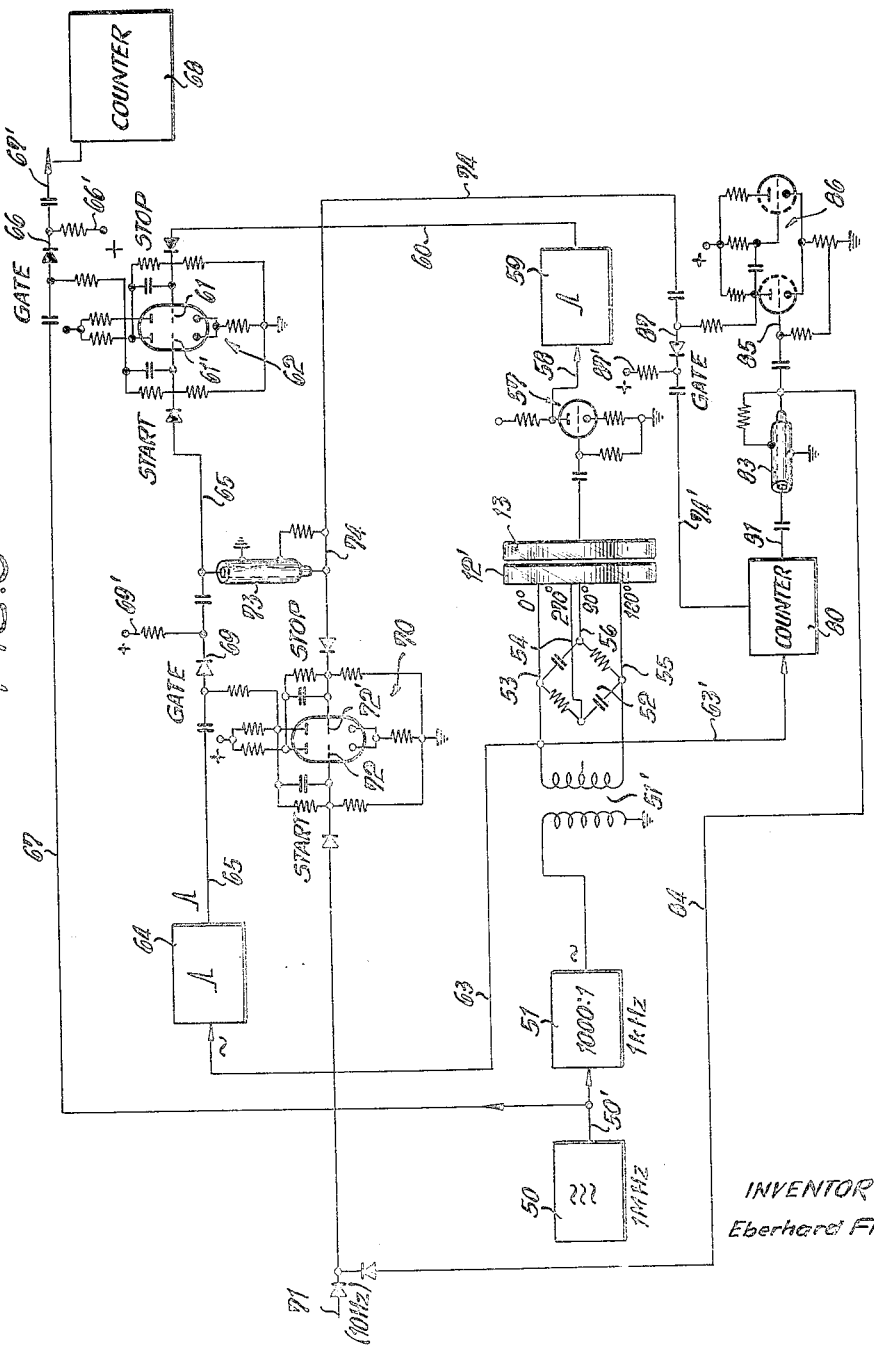

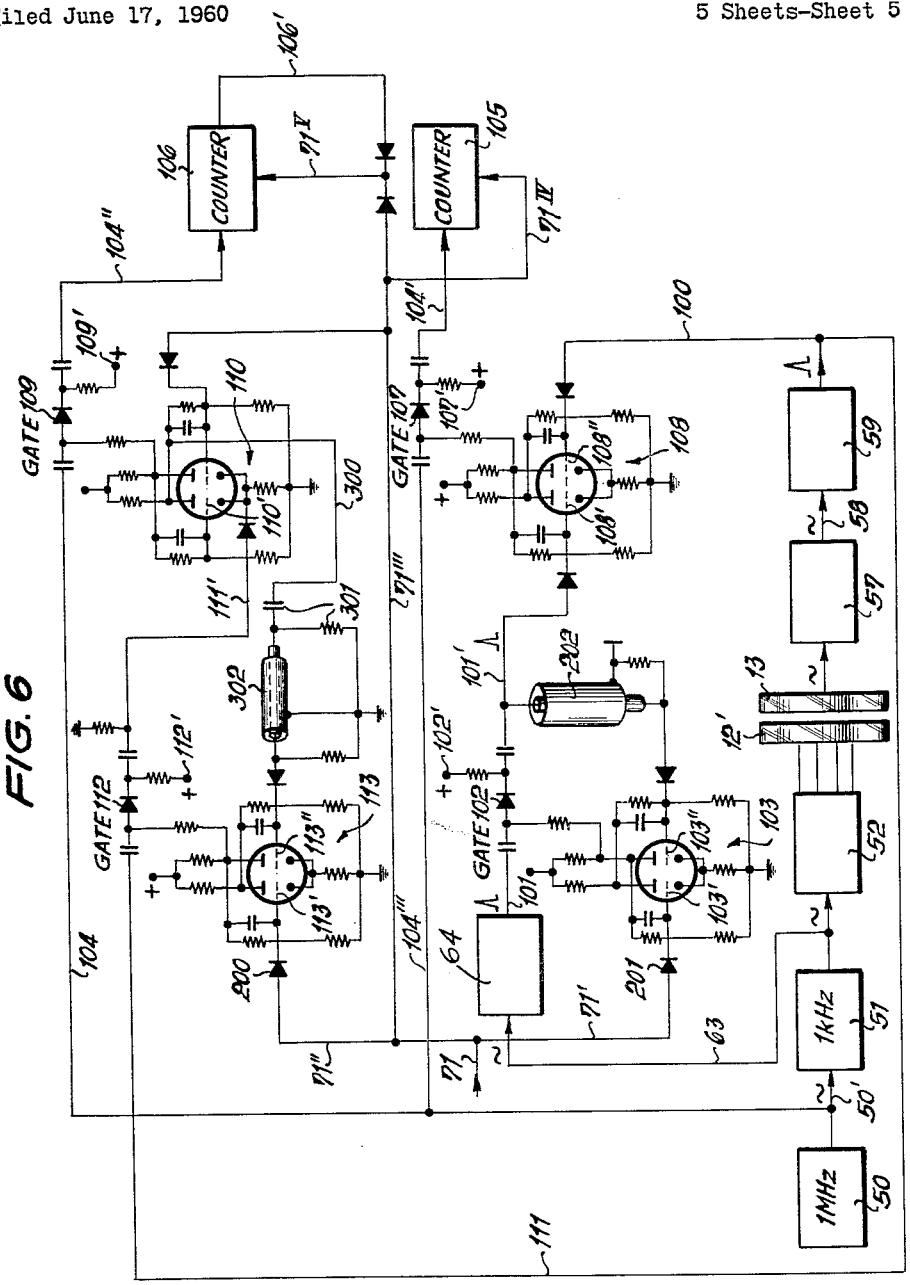

3,099,090
METHOD AND APPARATUS FOR DIGITAL INDICATION OF SHAFT POSITION
Eberhard Frisch, Berlin-Waidmannslust, Germany, assignor to Continental Elektroindustrie A.G., Askania-Werke, Berlin-Mariendorf, Germany, a corporation of Germany
Filed June 17, 1960, Ser. No. 36,771
Claims priority, application Germany June 19, 1959
10 Claims. (Cl. 33—46)

This invention concerns the method for digital indication of the instantaneous value of the position of a shaft, particularly one which is rotated with a changing acceleration, in which the angle of rotation is transformed, by a position-sensing transducer coupled to the shaft, into an alternating signal voltage with a phase angle which is proportional to the angle of rotation, and in which the phase angle of the alternating signal voltage is measured and recorded by an intermittently actuated counting and storage of the number of oscillations of a normal or standard frequency timing generator, corresponding portions of identical phase of the measuring or signal alternating voltage and of a reference alternating voltage initiating and terminating the counting process, so that the pulses counted are an indication of the shaft position.

The present invention deals especially with the improvement of procedures and devices, known in the prior art, for the indication and/or recording of the instantaneous values of the angle of elevation and the angle of azimuth of the rapidly moving target element of target-tracking instruments, e.g. of the type represented by recording theodolites or cinetheodolites. However in its broader aspects it may be used for measuring the instantaneous phase relation of any two voltages.

In the recording theodolite, as is well known, it is necessary to record for each target image, which is registered by the camera of the theodolite periodically, the corresponding position of its optical target-tracking element. In the past, one method employed has been to record photographically dials mounted at the axes of the theodolite telescope, simultaneously with recording of each target image, thus permitting evaluation of each image of the target with the corresponding orientation of the line of sight.

However, in many applications faster access to the target-aiming data of the target-tracking instrument is required. One approach is to couple movable electrodes to the shafts of the target-tracking instrument, and represent the instantaneous position of the target-tracking assembly in the form of electrical quantities which correspond to the position. Thus there are arrangements in which the shafts of the target-tracking device are provided with transducers which transform the mechanical angle of rotation into an alternating voltage with a phase angle which is proportional to the angle of rotation, so that the phase angle is always a measure of the position of the shaft.

Devices of this kind have quite a number of constructions. Typically, they are six-terminal devices, to the input side of which two phase-displaced alternating voltages are fed, and at the output of which an alternating current appears, the phase of which, upon rotation of the shaft which is coupled to the movable portion of the transducer, is continuously varied. Such devices consist of a rotor which is coupled to the shaft to rotate with respect to a stator, which remains stationary. Rotor and stator are coupled to each other either inductively or capacitatively. An inductive system of this kind has been described, for example, in U.S. Patent 2,799,835, and a capacitative system in Control Engineering, April 1959, pages 126 and 128.

In application of this type of transducer to target-tracking devices, the phase angle of the output signal voltage has been shown by digitally indicating or registering devices, employing a measuring procedure in which the phase angle of the signal voltage with respect to a voltage of fixed phase is determined by counting the oscillations of a generator of a normal or standard-frequency high enough so that the number of oscillations constitutes a sufficiently fine subdivision of one cycle of the reference voltage. For example, a passage through zero of a reference voltage of fixed phase is transformed into a pulse, which opens an electronic gate circuit. Through the gate, the relatively high frequency oscillations of the standard-frequency generator reach an electronic counting device, where the counting process is terminated in a stop-watchlike manner by a pulse which is derived from the signal alternating voltage at its passage through zero in the same manner as the initiating pulse is derived from the reference voltage, to close the gate.

The devices which have been outlined above have been applied to recording theodolites because they make it possible to record the values of the angles of azimuth and elevation of the position of the target-tracking telescope immediately upon punched cards or magnetic tape in digitally coded form. The recorded measured values can be evaluated in digitally operating calculating machines, and in this way a calculation of the trajectory or other data on the observed object in flight (airplane, rocket, satellite, etc.) is possible.

It has been found that such angle-measuring procedures are of limited applicability to many instruments for target-tracking which are in use; one has frequently to deal with the observation and tracking of rapidly moving objects of quickly changing speed and direction, and this means that the target-tracking instrument must be operated by applying high angular speeds and angular accelerations to the rotating shafts. With the systems described, an obvious "dynamic" error of the measurement is introduced, because the value which is to be measured changes rapidly, and the permitted interval of counting is limited by both the velocity and the acceleration. Errors of the measurement flow from the fact that the count recorded between the initiating of the oscillation series by the reference alternating voltage and its termination by the signal voltage is actually representative of the phase of the signal voltage at the time of the termination, not at the time of initiation. To make the data most useful, it is necessary that the successive camera exposures be exactly periodic, i.e., that they be triggered in synchronism with the reference voltage of fixed phase, not the signal voltage, whose phase is varying in accordance with position of the object tracked. Accordingly, the velocity of the object introduces an error, the simple count mentioned being indicative of the position of the monitored shaft at the time of cessation, rather than truly at the time of initiation, of the pulse series, thus introducing an error in the indication dependent on the motion occurring during the count. To meet this problem, it has heretofore been suggested that the difference in position (signal voltage phase) between successive periodic times of shutter operation may be used as an indication of velocity and the position as indicated at each shutter operation by the simple count described has been corrected by suitable use of the differential between that count and the count nominally indicative of the position or signal voltage phase at the time of the next previous (or subsequent) periodic camera operation. This solution to the problem, although satisfying the requirements of accuracy as regards correction for velocity if the latter can safely be assumed to be constant between shutter operations (or other periodic events as to which phase information is required) is again found to be erroneous where acceleration is an appreciable factor, particularly where acceleration itself cannot be considered to be sufficiently constant to introduce no substantial error due to changes between successive camera-operating (or similar periodic) occurrences. The present method, based on recognition of such errors and eliminating them, is characterized by the fact that in addition to each counting process proper as previously described, immediately ahead and/or after it in time another counting process is carried out and its result is stored to provide a basis for correction, the time interval between the two similar counting processes being very short compared to the time interval between the principal or primary periodic events for which the phase data is desired, so that the auxiliary count data can be used for correction of the primary or raw count (or other phase indication) data in a manner completely independent of changes in velocity, and to a large extent acceleration, during the intervals between the periodic times for which the exact phase data is the ultimate object.

The procedure according to the invention shall be described now with reference to the attached sheets of drawing, which show typical examples of embodiments of apparatus for the practice of the method of the invention.

FIGURE 1 shows the outside of a usual recording theodolite. FIGURE 2 shows individual features of the support of the movable electrode or transducer element which is coupled to the vertical shaft of the instrument, and the support of the rotatable part of the theodolite upon those parts of the instrument which remain stationary. FIGURES 3, 3a, 3b and 4 show details of the capacitive transducer employed in this typical example, which (in addition to the customary optical dial) is used to indicate the rotational position of the movable parts of the recording theodolite with respect to the stationary parts of this instrument. FIGURE 5 shows individual features of a device for the practice of the procedure of the invention in part schematically, and in part in detail. FIGURE 6 shows another device for the practice of a modified process according to the invention.

In FIGURE 1 the numeral 1 designates the telescope of the theodolite, with which are coordinated the two search-telescopes 2 and 3. By means of the search-telescopes two observers are in a position to follow the motion of the tracked object with telescope 1, by respectively using the oculars 2' and 3' and by actuating the control lever 4 and another control lever which cannot be seen in this figure, in such a manner that the object will coincide approximately with the center of a reticle (cross-hair) in the ocular of each of the searching telescopes. The control levers actuate servomotors, which, in agreement with the position of the levers, will control the speed of rotation of the instrument about the respective axes. Inside the housing 5 which is connected to the telescope 1, the recording camera of the theodolite is placed. It serves for the photographic registration of the tracked object. The release of the camera shutter occurs at preferably periodic or optionally aperiodic intervals. The camera is supported, together with the telescope 1, in supporting arms 6 and 7 for rotation about a horizontal axis, the two arms 6 and 7 being joined by a bottom structure 8, which is mounted on a base 9 for rotation about the vertical axis. The whole instrument is shown as placed upon a tripod 10.

FIGURE 2 shows some of the details of certain parts of FIGURE 1. The structure 8 can be turned together with the supporting arms 6 and 7, by means of ball bearings, around a central portion 12 of the base 9. The numerals 12' and 13 designate two glass rings which are spaced from each other, the facing surfaces of which have metal coatings, forming the capacitive transducer of the vertical shaft or axis. The horizontal axis in this instrument is equipped with a similar transducer.

The glass ring 12', which is at the outer circumference, carries upon its surface the usual optical circular dial, which dial is attached immovably to the base 9. The glass ring 13 is mounted in a plate 14, which rotates with respect to the central portion 12 of the base by means of a shaft 15.

The base plate 8' of the bottom structure 8 is coupled to the plate 14 by two spring-membranes 17 and 19, which are connected to each other adjustably by clamps 16 and 18. When bottom structure 8 is rotated upon base 9, the coupling 16, 17, 18, 19 turns the annular ring 13 with respect to ring 12'. The electric components of the transducer 12', 13 have not been shown in this figure, for the sake of simplicity.

In FIGURE 3 the stator 12' is shown, viewed from above. The annular ring 12', which consists of glass, carries on its surface two annular metal bands 30 and 31, which are electrically insulated from each other by means of a gap 32 defining their adjacent edges, the opposite edges of the annular metal bands being designated 33 and 34. At the circumference of the body 12' of the circular ring an annular band 35 accommodates the optical scale markers 35' of a dial which carries a sequence of numbers in the usual manner (the numbers are not shown). The annular ring bands 30 and 31 are divided by insulating gaps 36 and 37 respectively, which are cut out from these bands, into four electrodes 38, 39, 40 and 41 which are electrically insulated from each other. These four electrodes are composed of a number of partial electrodes which mesh with each other, into which by aid of leads (not shown) four alternating voltage phases are fed which have a phase difference with respect to each other of 90° at all times, opposed phases being impressed on each pair of electrodes so that the impressed voltages are in quadrature relation.

FIGURE 3a shows part of a section through the transducer portion of FIGURE 3 and FIGURE 3b shows a magnified view of a portion thereof.

In FIGURE 4 is shown the rotor 13 of the device, the surface of which carries an annular ring-shaped coating 43, the edges of this coating bearing the numerals 44 and 45. Within the band 43 is an insulating gap 46, which splits the annular ring surface 43 into two electrodes 47 and 48, the partial electrodes of which mesh with each other, like the electrodes of the rings 30 and 31.

In the arrangement of FIGURE 2 the annular ring bands 30, 31 and 43 of the figures just described lie opposite each other. They form a variable capacitive coupling such that four alternating voltage phases successively differing by 90°, which are fed into the electrodes 38 to 41, induce charges upon the electrodes 47 and 48 such that the alternating voltage between the two electrodes 47 and 48 corresponds in frequency to the frequency which is fed into the stator of the device, its amplitude upon rotation of the rotor with respect to the stator remaining more or less constant, but its phase angle being a function of the mechanical angle of rotation between the rotor and the stator of the device. Details of construction and electrical connection of the illustrated transducer are not further described herein, being disclosed in the copending application of the same inventor filed April 20, 1960, Serial No. 23,496, and the invention also being usable with the form of transducer shown in the Control Engineering publication previously cited. The phase angle of the voltage between electrodes 47 and 48 changes upon rotation of the rotor with respect to the stator.

In FIGURE 5 is shown one device for indicating the phase of this voltage according to the invention. In a typical use, the recording theodolite camera operates 10 times per second. At the time of each operation of photographing the target image, synchronously with each shutter release, an impulse is generated, so that there is available an impulse sequence of 10 cycles per second (10 Hz). The time between two of these impulses therefore corresponds to 100 milliseconds.

In this schematic drawing 12' and 13 are the rotor and the stator of the device which the described previously. A normal-frequency oscillator 50 furnishes a sinusoidal output voltage of a frequency of 1 megacycle. The sinusoidal output voltage is coupled at 50' to a frequency-dividing stage 51, where the frequency is scaled by a factor of 1000, i.e. to 1 kilocycle. The output voltage of the dividing stage, which still is sinusoidal, is coupled by a transformer 51' to a phase-shifter 52, from which are drawn through leads 53, 54, 55 and 56 two alternating voltage pairs which are shifted with respect to each other by 90°; these are fed into the electrodes 38, 39, 40 and 41 of the stator 12', which are thus in quadrature. The output voltage of the rotor 13 (one electrode being grounded) passes through an amplifier 57 coupled at 58 to an impulse-generating stage 59, which produces from the sinusoidal voltage a sequence of needle-shaped impulses phased with the crossing of the zero axis at the commencement of each sinusoidal cycle. This pulse train is coupled at 60 to one input 61 of a bistable trigger stage 62.

By a coupling lead 63 and an impulse-generating stage 64, one of the two input voltages to the stator 12' is fed to a lead 65 in the form of a needle impulse sequence employed for purposes to be described.

A diode gate 66 is controlled by the bistable stage 62. The diode gate 66 is in the coupling 67 between the standard frequency generator 50 and a counting or storing stage 68. The gate 66 is normally closed, i.e., opens during the counting measurement, as will hereafter be seen.

Another diode gate 69 is in the coupling formed by the lead 65, and is controlled by a bistable impulse stage 70.

The input 71 of the illustrated circuit is connected to a source of positive pulses generated substantially synchronously with the camera shutter release. This portion of the system is not shown, any well-known type of synchronization being suitable, such as mechanical periodic operation of the shutter, with the pulses produced by conventional synchronization contacts such as used in flash photography, or by electromagnetic operation of the shutter from a 10 cycle voltage source also producing the pulses. Each such pulse is impressed on the "Start" grid 72 of the bistable stage 70 and opens the diode gate 69, provided with the usual series resistor connected to voltage source 69'. The impulse channel 65 is thus opened, and the first positive needle impulse which occurs upon lead 65 (which corresponds to the next passage through zero of the reference voltage 63) reaches the "Start" grid 61' of the bistable stage 62 controlling the gate 66, which is again provided with the usual series resistance connection to a source of positive voltage 66'. The gate 66 is opened correspondingly, and through lead 67 the oscillations of the clock or timing oscillator 50 reach the storage or counting device 68. Meanwhile the first impulse which occurred on lead 65 after opening of gate 69 reaches a bus 74, by way of a delay line 73, and is fed to the "Stop" grid 72' of the bistable stage 70, and thus gate 69 becomes blocked again until it is again opened on the next shutter operation.

The oscillations of the oscillator 50 reach the counter 68 till through the coupling 60 the next needle impulse (generated by the first-occurring commencement of a new signal voltage cycle) reaches the "Stop" grid 61 of the bistable trigger stage 62. This impulse closes the gate 66, and in this way the counting process in 68 is terminated with the number of cycles of the 1 megacycle clock frequency occurring between the corresponding portions of the 1 kilocycle reference and signal voltages being recorded. With the measuring elements described thus far, as was stated above, it is difficult to do an accurate angle determination if the target-tracking device of the theodolite moves rapidly; the measurement is fully accurate only if the theodolite is at rest. If the theodolite is turned continuously during the act of measuring, then the impulse which stops the counting process will occur too early or too late (this depends upon the direction of the motion of the theodolite) for proper representation of the position at the time the camera was operated, and this way the result of the measurement obviously is falsified. According to the present invention at a time ahead of and/or behind the angle measurement itself which is small compared to the repetition interval of this measurement an additional measurement is undertaken, so that the results of the measurements may be subtracted from each other to permit a correction which is relatively independent of acceleration in eliminating errors due to velocity. It is possible to make very small the error of the measurement, by doing such a closely repeated measurement of the angle, or several such repetitions, and then calculating the angular velocity and correcting for it. This calculation can be done either instantly by simple electronic means, or one may wait till a time at which one evaluates the measurements, and then in the determination of the trajectory the pertinent corrections may be applied to the measured results.

The method of the invention assumes that the short delay time between the two measurements (principal and auxiliary) be very accurately known and constant. In practical cases it must be constant to better than 1%. In order to produce devices which make possible the practice of the present invention it is therefore required that one use accurate timing circuits which make it possible, once the principal counting process is started to start the auxiliary counting process at exactly the correct time thereafter. Therefore as a further development of the invention a device is provided in which, as shown in FIGURE 5, the auxiliary release-impulse for the gate 66 of the measuring device is derived from the constant-frequency generator 50. The frequency produced by this generator may be made very constant (better than 0.1%) so that one can do an accurate measurement.

The part of the device of FIGURE 5 already described is supplemented with an electronic counter 80, which is fed through lead 63' with the output voltage of the generator 50, as divided at 51 to form the reference voltage, and which is responsive to the occurrence of a predetermined number of cycles of the reference voltage to release a positive needle impulse upon its output lead 81. The counter 80 is so connected that its full counting content determines the time between the main and corrective phase measurements. If the delay in time which is desired to be obtained with the counter is, for example 4 milliseconds, then one may employ the cascading of two binary stages with the output voltage fed through an RC-differentiating circuit. The output impulse is sent through a delay line 83 and to a coupling 84 to the input 71, and a new counting process is commenced by the opening of the gate 66 by the accurately delayed twin of each 10-cycle input pulse synchronized with the camera so produced.

The impulse which reaches the bus 74 across the delay element 73, which impulse serves to close the gate 69 as previously described, also is fed simultaneously through the line 74' and a diode gate 87 to the counter 80 and serves there to reset that counter to the zero indication. (It will be understood that the counter 68 is also reset after each counting operation there performed, after having its indication suitably recorded.) The gate 87 is controlled by a monostable multivibrator 86, which operates in connection with a voltage source 87' in the same manner as the other diode gates. Normally, i.e., in the state of rest, the right side of the double triode system 86 conducts, thus keeping the diode gate 87 open. The delayed starting impulse from the counter 80, which reaches the grid 85 of the left part of the tube of the monostable multivibrator 86, carries this multivibrator into the unstable state in which the left part of the tubes carries a current, and thus the gate 87 becomes blocked. The time-constant of the monostable multivibrator 86, i.e. the time during which the left tube of the system 86 carries a current, is chosen so that the impulse channel 74' is blocked sufficiently long so that only the starting impulse which occurs in lead 71 after the first counting process can bring about through the delay line 73 a resetting (to zero) of the counter 80. Therefore the next counting cycle of the counter 80 starts only when the next 10-cycle shutter pulse or 10-cycle indicator impulse arrives.

Concerning the construction of the counting and storage part 68 of the device as described, it should be added that this part consists preferably of two count-storage units, a calculating stage and an information-release-storage unit. The two count-storage units store the counting result of the two measurement procedures. The calculating stage relates the two counting results and feeds the mathematically handled measurement-result into the third storage stage, where the result of the overall measurement resulting from the two counting processes is registered, e.g. on punched cards, magnetic tapes or in any other suitable manner. In an alternative arrangement, the two counting results are registered independently of any kind of mathematical treatment, and the measurements are evaluated later on by different calculating machines which are units by themselves and are not self-contained in the theodolite described.

FIGURE 6 shows another device according to the invention, by means of which a modified measuring process can be done in a slightly different manner than described with respect to FIGURE 5.

50 again designates the 1 megacycle standard frequency generator, 51 is the frequency divider, the output voltage (at 1 kilocycle) of which is fed into the phase shifter 52 and is fed from there into the capacitive transducer 12', 13. The output voltage is again phase-variable in agreement with the theodolite rotation, being fed from 13 to a bus 100 through amplifier 57, coupling 58 and needle-impulse-generator 59, i.e. reaching bus 100 in the shape of a sequence of 1-kilocycle needle impulses. In the following, the sequence of impulses available on lead 100 shall be designated as the "measuring impulse sequence." The output voltage of the frequency divider 51 is also fed through lead 63 into the second impulse-forming stage 64 and appears on the line 101 as a sequence of 1 kilocycle impulses. It serves as the reference value for the phase measurement. Its phase position is coupled rigidly with the phase of the generator 50.

The numeral 102 designates a diode gate which lies in the lead 101, 101', being controlled by a bistable multivibrator 103. The generator 50 is connected by gated couplings 104, 104' and 104, 104" with the counters 105 and 106, respectively. In the line 104, 104' is a diode gate 107, controlled by a bistable trigger stage 108, and in the line 104, 104" is a gate 109, controlled by a bistable stage 110.

The sequence of measuring impulses appears at the output of pulse-former 59 in the line 100, and is fed by line 111 to a gate 112, which is controlled by the bistable multivibrator 113, the measuring pulses being fed by line 111' to the cathodes of a circuit 110 when the gate is open.

The numeral 71 again designates the lead which carries the initiating impulses. The 10-cycle-impulses on this lead feed the grid 103' of the control stage 103 through lead 71', the grid 113' of the control stage 113 through lead 71", and the grid 110' of the stage 110 through lead 71''', and also the reset input of the counter 105 through lead 71$^{IV}$ and the reset input of the counter 106 through lead 71$^V$.

A positive initiating impulse which enters the circuit across 71 produces a resetting of the counters 105 and 106 back to zero. Simultaneously the impulse which enters across 71 is fed by leads 71' and 71", respectively through coupling diodes 200 and 201 to the grids 103' and 113'. In this manner the bistable multivibrators 103 and 113 are tripped so that the gates 102 and 112 are opened and in similar manner the gate 109 is simultaneously closed. In this state therefore (a) the counters 105 and 106 are brought back to zero and are ready for counting, (b) the gates 102 and 112 are opened, and (c) the gate 109 is closed. An impulse produced from the reference voltage then reaches the grid 108' of the control stage 108 to open gate 107, this same pulse also feeding through a delay element 209 to the grid 103" of the stage 103 and immediately closing the gate 102 again. Gate 107 permits the oscillations of the oscillator 50 to reach the counter 105, and they are counted till the first pulse produced by the signal voltage in pulse-former 59 appears and closes the gate 107, terminating the counting process in the counter 105. The counting result stored in 105 corresponds therefore to the time between identical-phase states of oscillation of the reference voltage at 63 and the signal voltage at 58. The result of the count is proportional to the phase difference at the time of initiation except for the error correction to be described.

In the portions so far described, the function of the circuits of FIGURE 6 corresponds in general to the circuits of FIGURE 5, and the result of the measurement from this counting process exactly corresponds to the position of the theodolite at the time of initiation only when the system is at rest.

Motion of the theodolite during a cycle produces a phase or apparent frequency shift amounting to a shortening or an increase of the duration of the period of the signal voltage. In the present embodiment, a second counting process is performed as previously, but one which determines the duration of the period of the measuring or signal alternating voltage to indicate the velocity correction.

In order to determine the changeable duration of the period of the measuring alternating voltage at 58 (the time between two needle-impulses on the line 100) the counter 106 is provided. This counter in the typical example presented is purposely constructed such that its counting capacity for the clock pulses will correspond to the duration of the regular period of the alternating reference voltage at 63. In the case presently described this is one millisecond, so that the counter 106 must count 1000 oscillations of the 1 megacycle generator when the theodolite is at rest. When this counting capacity is reached, the counter sends through lead 106', 71$^V$ a pulse with which it resets itself, so that the counting process can start anew.

The supplemented arrangement according to FIGURE 6 allows the determination of the effective period or duration of the signal voltage as follows: The impulse which closes gate 107 simultaneously opens the gate 109 by reversing the stage 110, so that oscillations of the clock oscillator 50 can reach the counter 106. The stage 110 is a parallel-input trigger pair constructed so that the second impulse occurring in line 111', i.e., the impulse which follows the impulse which opens gate 109, will close gate 109, so that the counting result in 106 will correspond to the duration of the period of the measuring impulse sequence at 100.

Upon the closing of gate 109 there is picked off in a line 300 by RC-differentiation a needle impulse at 301, which is fed through a delay element 302 to the grid 113" of the stage 113, closing the gate 112.

The count recorded in the counter 106 is indicative of the velocity correction. After the termination of the second counting process the counting results which are stored in the counters 105 and 106 may be employed to produce a corrected phase (position) indication, the percentage correction in the count of counter 105 being the percentage deviation of the count in counter 106 from its full capacity (the sign of the correction being, of course, determined from the general magnitude of the count).

The typical example explained of the operation of FIGURE 6 differs from FIGURE 5 essentially in that in the embodiment of FIGURE 5 two counting processes are done, both of which are limited by oscillation states of identical state of phase of the signal and of the reference voltages, whereas in the embodiment of FIGURE 6 one count is determined by identical-phase oscillation states of the signal and reference alternating voltages, whereas the other count is determined by identical phase states of oscillation of the signal voltage. Both procedures have in common that the interval of time between two counting processes is smaller than would be required to produce acceleration error of substantial magnitude.

It is self-evident that the embodiment of the procedure according to the invention is applicable not only to the capacitive transducer system as described, any phase-altering transducer being suitable. Nor is the invention restricted to recording theodolite setups and similar target tracking devices. One can also apply the method of the invention to other devices in which the angular position of a shaft or axle is to be determined, or indeed to other phase measurements presenting analogous sources of error.

It should finally be stressed that the phase-angle measuring device of the invention is of course not restricted to arrangements in which only one boundary of the intervals of counted time is variable with respect to the time at which the phase is intended to be measured; the method of the invention may be applied also to arrangements in which both limits of the counting time may change in relation to the time at which the condition is desired to be exactly represented by the count.

What is claimed is:

1. In a method of periodically producing an indication of the instantaneous value of a phase angle between a reference voltage of fixed phase and a signal voltage of phase and rate of change of phase changing with time, the steps of initiating a series of pulses upon occurrence of a fixed point in each of widely and equally spaced cycles of the reference voltage, terminating each such series of pulses upon the next occurrence of a fixed point of the signal voltage cycle, producing indications of the number of pulses, in each such series, generating, in association with each such series so periodically generated, a second series of pulses of a number at least partially responsive to the phase of the signal voltage at a time differing from the time of initiation of each such first series by an interval much smaller than the interval of such periodicity, and producing indications of the number of pulses in each of said second series of pulses, whereby errors due to change of phase of the signal voltage during each first series of pulses may be corrected to produce a substantially true indication of the relative phase at the time of commencement of such first series despite differences in the rate of change of phase of the signal voltage occurring over said periods.

2. The method of claim 1 wherein each said second series is also initiated upon occurrence of a fixed point of the reference voltage cycle and terminated upon next occurrence of a fixed point of the signal voltage cycle, so that the difference between the numbers of pulses in the two series constitutes a substantially accurate indication of the rate of change of phase occurring during each such first series.

3. The method of claim 2 including the further step of producing an indication of the difference between the two series.

4. The method of claim 1 wherein said second series is both initiated and terminated upon occurrence of corresponding portions of a cycle of the signal voltage, so that the number of pulses in said second series constitutes a substantially accurate indication of the rate of change of phase occurring during each such first series.

5. The method of producing an indication of periodic instantaneous values as set forth in claim 1 wherein the rate of change of phase of the signal voltage with time is variable with a known upper limit and the difference between the time of initiation of each first series and the time of occurrence of the phase to which each second series is responsive, when multiplied by the maximum value of the derivative of the rate of change of phase, is small compared to the upper limit of the rate.

6. The method of producing instantaneous values as set forth in claim 1 at the time of periodic exterior occurrences comprising the method of claim 1 including the further step of synchronizing the initiation of each such first series with the exterior occurrence.

7. The method of producing indications of a coordinate value of a recording theodolite at the times of actuation of a camera therein comprising the steps of varying the phase of a signal voltage with respect to a reference voltage in accordance with the coordinate value, periodically actuating the camera, and producing successive indications of the instantaneous values as set forth in claim 1, each actuation of the camera being synchronized with only the initiation of each first series of pulses.

8. A method of producing indications of instantaneous positions of a shaft of varying speed at the exact times of occurrence of successive external events occurring at a completely periodic rate comprising initiating a series of pulses synchronously with each occurrence of the external event, terminating each such series of pulses after an interval responsive to the position of the shaft at the time of such termination, producing an indication of the number of pulses occurring in each such series, and producing an indication of the speed of the shaft at a time spaced from such initiation by an interval small compared to the repetition period of the event.

9. In a method of producing an indication of the instantaneous value of a phase angle between a reference voltage of fixed phase and a signal voltage of phase and rate of change of phase changing with time, the steps of generating a series of pulses of a number corresponding to the interval commencing at a fixed point in the reference voltage cycle and ending at a fixed point in the signal voltage cycle, generating a second series of pulses of a number corresponding to the interval commencing at a fixed point in the signal voltage cycle and ending at the same fixed point in the voltage cycle, and recording both numbers, so that deviation of the number of pulses in the second series from a number corresponding to the interval of a cycle of fixed phase is indicative of the rate of change of phase and may be employed to correct the first number for changes of phase occurring during the first series.

10. The method of claim 9 wherein the recording of the second number includes the step of counting the pulses in a recycling counter having a full capacity equal to the number of pulses corresponding to the interval of a cycle of fixed phase, so that the difference between the number of pulses registered by the counter and its full capacity is a direct indication of the rate of change of phase without further calculation.

References Cited in the file of this patent

UNITED STATES PATENTS

| 2,811,716 | Crist | Oct. 29, 1957 |
| 2,893,123 | Bach et al. | July 7, 1959 |
| 2,991,462 | Hose | July 4, 1961 |

OTHER REFERENCES

Moore: "Digital Phase Angle Meter Control," I.B.M. Technical Disclosure Bulletin, vol. 3, No. 2, July 1960. (Copy in Div. 48.)